US011422844B1

(12) United States Patent
Filiz et al.

(10) Patent No.: US 11,422,844 B1
(45) Date of Patent: Aug. 23, 2022

(54) CLIENT-SPECIFIED NETWORK INTERFACE CONFIGURATION FOR SERVERLESS CONTAINER MANAGEMENT SERVICE

(71) Applicant: Amazon Technologies, Inc., Seattle, WA (US)

(72) Inventors: Onur Filiz, Redmond, WA (US); Micah William Hausler, Bellevue, WA (US); Archana Srikanta, Seattle, WA (US); Sri Saran Balaji Vellore Rajakumar, Bothell, WA (US); Eswar Chander Balasubramanian, Kirkland, WA (US); Anirudh Balachandra Aithal, Seattle, WA (US); Ryan Marchand, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 16/698,655

(22) Filed: Nov. 27, 2019

(51) Int. Cl.
*G06F 9/455* (2018.01)
*G06F 9/54* (2006.01)
*H04L 67/10* (2022.01)
*H04L 9/40* (2022.01)

(52) U.S. Cl.
CPC .......... *G06F 9/45558* (2013.01); *G06F 9/547* (2013.01); *H04L 63/0272* (2013.01); *H04L 67/10* (2013.01); *G06F 2009/4557* (2013.01); *G06F 2009/45595* (2013.01)

(58) Field of Classification Search
CPC ................ G06F 9/45558; G06F 9/547; G06F 2009/4557; G06F 2009/45595; H04L 63/0272; H04L 67/10

USPC ............................................................ 718/1
See application file for complete search history.

(56) References Cited

U.S. PATENT DOCUMENTS

| 9,256,467 B1 | 2/2016 | Singh et al. |
| 9,549,038 B1 | 1/2017 | Anne |
| 9,910,713 B2 | 3/2018 | Wisniewski et al. |
| 9,928,108 B1 | 3/2018 | Wagner et al. |

(Continued)

OTHER PUBLICATIONS

U.S. Appl. No. 16/217,454, filed Dec. 12, 2018, Aithal et al.

(Continued)

*Primary Examiner* — Kenneth Tang
(74) *Attorney, Agent, or Firm* — Knobbe Martens Olson & Bear, LLP

(57) ABSTRACT

The present application relates to providing a mechanism for specifying multiple network interfaces to be configured for on-demand compute capacity and for obtaining the credentials needed to configure the multiple network interfaces. For example, a container orchestration service may specify, in its code execution request to a serverless container management service, that multiple network interfaces are needed for the requested compute capacity. In response, the serverless container management service can identify the multiple network interfaces, determine the credential to be used to configure each of the multiple network interfaces, and attach the multiple network interfaces to the compute capacity acquired on behalf of the container orchestration service. During execution, the code running inside the compute capacity can utilize the multiple network interfaces as specified by the owner of the code.

20 Claims, 9 Drawing Sheets

(56) References Cited

U.S. PATENT DOCUMENTS

| | | |
|---|---|---|
| 10,067,801 B1 | 9/2018 | Wagner |
| 10,432,551 B1 | 10/2019 | Vosshall et al. |
| 10,606,660 B1 | 3/2020 | Hartley et al. |
| 10,771,337 B1 | 9/2020 | Das et al. |
| 10,824,474 B1 | 11/2020 | Kamboj et al. |
| 10,871,995 B2 | 12/2020 | Gerdesmeier et al. |
| 2012/0210326 A1 | 8/2012 | Torr et al. |
| 2013/0124807 A1 | 5/2013 | Nielsen et al. |
| 2013/0160008 A1 | 6/2013 | Cawlfield et al. |
| 2013/0238785 A1* | 9/2013 | Hawk .................. G06F 9/5077 709/224 |
| 2014/0358710 A1 | 12/2014 | Balestrieri et al. |
| 2015/0106805 A1 | 4/2015 | Melander et al. |
| 2015/0142878 A1 | 5/2015 | Hebert et al. |
| 2016/0077846 A1 | 3/2016 | Phillips et al. |
| 2016/0112497 A1* | 4/2016 | Koushik .................. G06F 8/61 726/7 |
| 2016/0378559 A1 | 12/2016 | Bhandarkar et al. |
| 2017/0078433 A1 | 3/2017 | Radhakrishnan et al. |
| 2017/0090961 A1 | 3/2017 | Wagner et al. |
| 2017/0177413 A1 | 6/2017 | Wisniewski et al. |
| 2017/0177860 A1 | 6/2017 | Suarez et al. |
| 2017/0339158 A1 | 11/2017 | Lewis et al. |
| 2017/0339196 A1 | 11/2017 | Lewis et al. |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0150325 A1 | 5/2018 | Kuo et al. |
| 2018/0246745 A1 | 8/2018 | Aronovich et al. |
| 2018/0331971 A1 | 11/2018 | Certain et al. |
| 2019/0102231 A1 | 4/2019 | Wagner |
| 2019/0108049 A1 | 4/2019 | Singh et al. |
| 2019/0294477 A1 | 9/2019 | Koppes et al. |
| 2019/0324786 A1 | 10/2019 | Ranjan et al. |
| 2019/0340033 A1 | 11/2019 | Ganteaume |
| 2019/0342266 A1* | 11/2019 | Ramachandran ... H04L 63/0272 |
| 2020/0073649 A1 | 3/2020 | Viana et al. |
| 2020/0084202 A1* | 3/2020 | Smith .................... H04L 67/28 |
| 2020/0142711 A1 | 5/2020 | Varda et al. |
| 2020/0174842 A1 | 6/2020 | Wang et al. |
| 2020/0213279 A1 | 7/2020 | Xiong et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0358719 A1 | 11/2020 | Mestery et al. |
| 2020/0412596 A1 | 12/2020 | Cherunni |
| 2021/0064442 A1 | 3/2021 | Alluboyina et al. |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0144517 A1* | 5/2021 | Guim Bernat ...... G06F 11/3006 |
| 2021/0158083 A1 | 5/2021 | Gan et al. |
| 2021/0160162 A1 | 5/2021 | Abbas |
| 2021/0184942 A1 | 6/2021 | Tootaghaj et al. |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.

* cited by examiner

CLIENT-SPECIFIED NETWORK INTERFACE CONFIGURATION FOR SERVERLESS CONTAINER MANAGEMENT SERVICE

BACKGROUND

Modern computer systems are frequently implemented as distributed collections of computer systems operating collectively within one or more host computer system environments. As part of this implementation, software containers, which are lightweight, virtualized execution environments for applications, are frequently used. Containers allow for easily running and managing applications across a cluster of servers or virtual machines. Applications packaged as containers can be deployed across a variety of environments, such as locally and within a compute service. Compute services may provision virtual machines to host containers on behalf of customers.

DETAILED DESCRIPTION

Introduction

Figure 1:
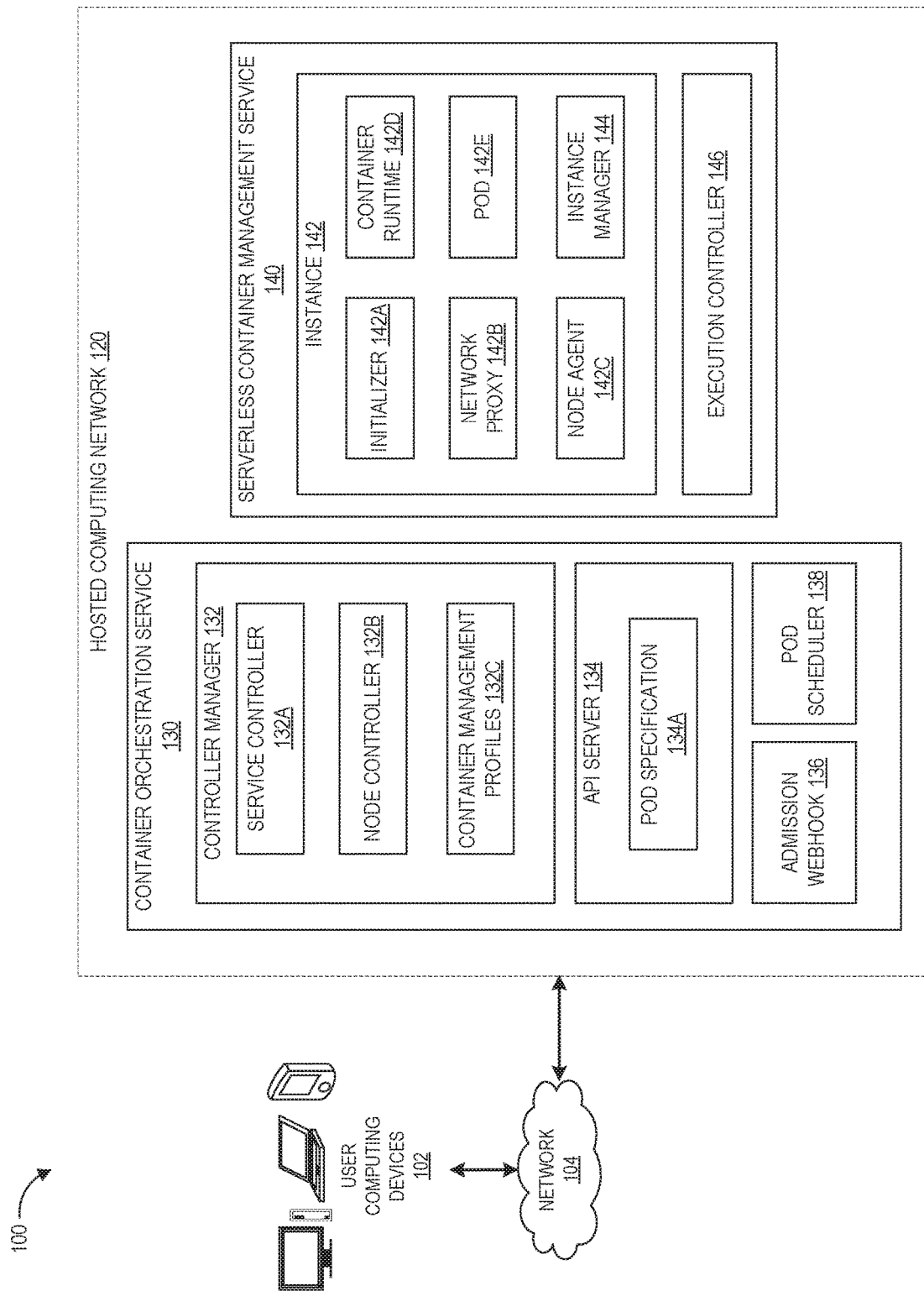
FIG. 1 depicts a schematic diagram of a network environment in which a hosted computing network implements a container orchestration service and a serverless container management service in accordance with aspects of the present disclosure.

The present disclosure relates to providing automated management of compute resources on behalf of users of a hosted computing network (sometimes known as a "cloud" provider network) who wish to utilize a third party container orchestrator via the hosted computing network. The hosted computing network provides a container orchestration service that allows its users to run containerized applications using third party container orchestrators, for example open source container orchestrators such as KUBERNETES®, and other non-open source container orchestrators. As used herein, a third party container orchestrator refers to a container orchestrator where its program code is not entirely written and/or managed by the cloud provider. Although many cloud provider networks have their own container orchestration offerings, customers can desire to use other third party container orchestrators, for example to have consistency between their on-premise containerized applications and their cloud-based containerized applications. Typically, to use a third party container orchestration service in a cloud provider network, a customer first needs to provision compute resources (such as virtual machines) in the cloud, and then the customer can use the third party container orchestration service in conjunction with their provisioned resources. For example, the container orchestration service may receive a request to execute a container orchestration pod (or simply "pod") on the container orchestration service, identify one (or more) of the virtual machines in the user's account that can be used to execute the pod, and cause the pod to be executed on the identified virtual machine.

Such users typically need to manage the underlying compute resources used to execute their containerized applications. For example, these users would need to set up their own virtual machines that can be used to execute their containerized applications, and also manage scaling, monitoring, patching, and security of these virtual machines. However, having to worry about management tasks such as setting up the right type of compute resources and monitoring the utilization levels to scale the compute resources up or down, on top of developing the program code for the application and figuring out its resource requirements, can be quite burdensome to the users and result in inefficient implementation of the underlying compute resources.

The presently disclosed technology addresses these technical problems by enabling the third party container orchestration service to interface with a serverless container management service of the cloud provider that can provide on-demand compute capacity customized to the needs of incoming code execution requests received by the container orchestration service. The serverless container management service may provide "serverless containers" in a manner that abstracts away the underlying infrastructure, enabling, by managing clusters of compute capacity on their behalf, the users to simply focus on their containerized application. "Serverless," as used herein, refers to a cloud computing experience wherein a customer provides code to be executed in the cloud provider network, but does not have to provision or manage the underlying server resources (e.g., virtual machines, bare metal servers), which are instead managed by a service of the cloud provider and may not even be listed as resources in the customer's account. By acquiring the compute capacity from such a serverless container management service instead of using the users' own compute resources, the container orchestration service can extend serverless container management to third party, open source container software such as KUBERNETES software.

Additionally, the present disclosure relates to providing the ability for users of a serverless container management service to specify multiple network interfaces to be attached to on-demand compute capacity (e.g., virtual machines, micro virtual machines, containers, and the like). In some conventional single-network-interface implementations, users are able to request configuration of only their own network interfaces. However, in some cases, such users may be requesting on-demand compute capacity from the serverless container management service on behalf of their own customers. For example, the container orchestration service may be requesting compute capacity to be used to execute a program code in response to a code execution request from one of its customers. In such cases, the container orchestration service may wish to allow the program code being executed on the acquired compute capacity to access not only the network resources of the container orchestration service but also its customer's network resources as well (e.g., network resources of the owner of the program code). Conventional single-network-interface implementations may not allow such flexibility.

The presently disclosed technology addresses these technical problems by providing a mechanism for specifying multiple network interfaces to be configured for given compute capacity and for obtaining the credentials needed to configure the multiple network interfaces. By allowing a user to specify multiple network interfaces (e.g., a network interface via which the user's network resources can be accessed as well as another network interface via which the user's customer's network resources can be accessed), the serverless container management service can facilitate the usage of its on-demand compute capacity not only by direct users but also by container orchestrators and other services that service their own users.

The aforementioned problems, among others, are addressed in some embodiments by the disclosed techniques for automating management of compute resources used to run containerized applications in connection with third party container orchestration systems, such as the KUBERNETES system. As described above, the present application provides a mechanism for executing a containerized application (e.g., a user's application code, configurations, and dependencies packaged into a single object) in a nested manner on two separate container orchestration services. For example, a user may submit a request to a container orchestration service to execute a containerized application, and in response, instead of identifying one of the existing compute instances belonging to the user and executing the containerized application on the identified compute instance, the container orchestration service may generate and submit a request to a serverless container management service that can not only acquire compute resources on behalf of the container orchestration service, but also manage the compute resources such that the container orchestration service (or the original requesting user) does not need to manage scaling, monitoring, patching, and security of the compute resources.

Further, as described herein, another aspect of the present disclosure relates to providing a mechanism for specifying multiple network interfaces to be configured for on-demand compute capacity and for obtaining the credentials needed to configure the multiple network interfaces. For example, a container orchestration service may specify, in its code execution request to a serverless container management service, that multiple network interfaces are needed for the requested compute capacity. In response, the serverless container management service can identify the multiple network interfaces, determine the credential to be used to configure each of the multiple network interfaces, and attach the multiple network interfaces to the compute capacity acquired on behalf of the container orchestration service. During execution, the code running inside the compute capacity can utilize the multiple network interfaces as specified by the owner of the code (e.g., the customer of the container orchestration service).

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Hosted Computing Network

FIG. 1 depicts a computing environment 100 in which a container orchestration service 130 and a serverless container management service 140 are implemented on a hosted computing network 120. The computing environment 100 includes user computing devices 102 in communication with the hosted computing network 120 via a network 104. The container orchestration service 130 as implemented by the hosted computing network 120 includes a controller manager 132, an application programing interface (API) sever 134, an admission webhook 136, and a pod scheduler 138. Further, the serverless container management service 140 as implemented by the hosted computing network 120 includes an instance 142, and an execution controller 146. Although only a single instance is shown in FIG. 1, in other embodiments, the serverless container management service 140 may include multiple instances, which can be virtual machine instances and/or bare-metal instances.

The hosted computing network 120 (also referred to in some implementations as a cloud provider network) can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another such that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider network) connecting each region to at least one other region. The cloud provider network may deliver content from points of presence outside of, but networked with, these regions by way of edge locations and regional edge cache servers.

The hosted computing network 120 can use this infrastructure to provide a large pool of network-accessible computing resources (such as compute, storage, and networking resources, applications, and services), which may be virtualized or bare-metal. The hosted computing network 120 can provide convenient, on-demand network access to a shared pool of configurable computing resources that can be programmatically provisioned and released in response to customer commands. These resources can be dynamically provisioned and reconfigured to adjust to variable load, which provides the "elasticity" of the hosted computing network 120. It will be appreciated that the disclosed compute resource and network interface management techniques may be implemented in non-elastic computing environments as well.

These computing resources may include virtual machines and/or containers created thereon. A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries, and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, for example, the container orchestration service 130 or the serverless container management service 140 described herein, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a hosted computing network to execute a task. A task definition can specify parameters including which container image to use with each container in the task, interactions between containers, constraints on container placement within a hosted computing network, what quantities of different hardware resources should be allocated to the task or to specific containers, networking modes, logging configurations, and persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a hosted computing service can deploy containers by managing clusters of compute instances that run container agents. In such implementations, customers manage scaling, monitoring, patching, and security of the compute instances, in addition to managing their containerized workload. In some implementations, customers of a hosted computing service may deploy and scale containerized workloads automatically without having to manage the underlying computing resources, for example, via the serverless container management service 140 described herein, that receives information from a customer about their workload and then automatically selects the appropriate compute resources to run the workload. Beneficially, such a "serverless container" approach abstracts away the underlying infrastructure, enabling, by managing clusters of compute instances on behalf of the customer, the customer to simply focus on their containerized application.

References to code or user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular data transformation developed by the user. As noted above, individual collections of user code (e.g., to achieve a specific function) may be referred to as "pods" or "tasks," depending on the context, while specific executions of that code (including, e.g., compiling code, interpreting code, or otherwise making the code executable) may be referred to as "code executions" or simply "executions." User code may be written, by way of non-limiting example, in JavaScript (e.g., node.js), Java, Python, or Ruby (or another programming language).

With continued reference to FIG. 1, the various components of the container orchestration service 130 allow the users of the container orchestration service 130 to run containerized applications using third party, container orchestrators such as KUBERNETES.

The controller manager 132 includes a service controller 132A, a node controller 132B, and container management profiles 132C. The controller manager 132 provides the interface between a container orchestration cluster (e.g., a KUBERNETES cluster) and the APIs of the hosted computing network 120. For example, the controller manager 132 may allow a container orchestration cluster to provision, monitor, and remove the computing resources of the hosted computing network 120 utilized for operation of the cluster.

The service controller 132A may monitor the current state of the services in the third party, system such as KUBERNETES, and configure the components of the hosted computing network 120 (e.g., a load balancer of the hosted computing network 120) to reflect the current state. The service controller 132A may also determine that the components of the hosted computing network 120 are up to date.

The node controller 132B may initialize the compute capacity (e.g., of container orchestration nodes) used by the container orchestration service 130 to execute program codes. For example, the node controller 132B may obtain information about the compute capacity provided by the hosted computing network 120 and associate the obtained information to the compute capacity (e.g., specific zones/regions, instance types, instance sizes, network addresses and hostnames). The node controller 132B may determine whether a given node has been deleted, and if so, delete the node object.

The container management profiles 132C may include profiles created by users of the container orchestration service 130 for executing their program codes via the container orchestration service 130. A container management profile may specify the resources needed to execute a given program code, such as network addresses and permissions. The user creating the container management profile may also define the conditions under which a program code (e.g., a KUBERNETES pod) is executed using existing compute resources of the user (e.g., a KUBERNETES cluster) and the conditions under which a program code is executed using compute capacity newly provisioned by another service such as the serverless container management service 140 of FIG. 1.

A pod is the basic execution unit of a container orchestration application (such as a KUBERNETES application), and is the smallest and simplest unit in the container orchestration object model that can be created or deployed. A pod represents processes to be executed on the compute capacity acquired or selected by the container orchestration service 130. A pod may encapsulate an application's container (or, in some cases, multiple containers), storage resources, a unique network IP address, and options that govern how the container(s) should be executed. Although a pod is used as an example herein, in other embodiments, the container orchestration service 130 may use other types of execution units. A pod can be used to implement a variety of applications such as web servers, databases, and the like.

Users of the container orchestration service 130 may create a profile by calling an API provided by the container orchestration service 130. The profiles may be used by the pod scheduler 138 to determine how to schedule an incoming pod. Additionally, the permissions specified by the profiles may be used by the node agent 142C to access container images of the pod.

The API server 134 may be an API server of the container orchestrator (e.g., a KUBERNETES API server), exposed to the users of the container orchestration service 130 as a public endpoint. The API server 134 may implement a RESTful API over HTTP and may be responsible for validating, configuring and storing API objects, which include pods, services, replication controllers, and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

The pod specification 134A specifies how a pod should be executed, including which containers should be executed within the pod and which storage volumes the pod should mount. The pod specification 134A of a pod may include an identifier associated with a specific profile of the container management profiles 132C for associating the pod with the specific profile. When the pod specification of a pod does not specify a profile, the pod may be associated with a default profile of the container management profiles 132C. The pod specification 134A may also specify a namespace, which can be used by the admission webhook 136 or the pod scheduler 138 to determine how and where to execute the pod.

For example, based on the pod specification 134A of a pod indicating that the pod belongs to the namespace associated with a specific team, the admission webhook 136 may pass the pod specification 134A to a pod scheduler configured to request on-demand compute capacity from the serverless container management service 140 and execute the pod using the acquired compute capacity (as opposed to another pod scheduler configured to execute the pod using available compute capacity without sending such a request to the serverless container management service 140). Alternatively, based on the pod specification 134A of a pod indicating that the pod belongs to the namespace associated with another team (e.g., a team different from the specific team referenced above), the admission webhook 136 may pass the pod specification 134A to a pod scheduler configured to execute the pod using available compute capacity without requesting on-demand compute capacity from the serverless container management service 140 (as opposed to another pod scheduler configured to request on-demand compute capacity from the serverless container management service 140 and execute the pod using the acquired compute capacity).

As another example, based on the pod specification 134A of a pod including a label associated with high-priority requests and also indicating that the pod belongs to the namespace associated with the specific team, the pod scheduler 138 may request on-demand compute capacity from the serverless container management service 140 and execute the pod using the acquired compute capacity (as opposed to executing the pod using available compute capacity without sending such a request to the serverless container management service 140). Alternatively, based on the pod specification 134A of a pod including a label associated with low-priority requests and also indicating that the pod belongs to the namespace associated with the specific team, the pod scheduler 138 may execute the pod using available compute capacity without sending such a request to the serverless container management service 140 (as opposed to requesting on-demand compute capacity from the serverless container management service 140 and executing the pod using the acquired compute capacity).

The admission webhook 136 can either reject or approve the incoming pod, and may optionally mutate some fields in the pod specification 134A. The admission webhook 136 may determine, by comparing the pod specification 134A to the container management profile 132C, how the pod should be executed (e.g., using the available compute capacity of the user account associated with the pod or using on-demand compute capacity acquired from the serverless container management service 140 on behalf of the container orchestration service 130).

For example, based on the pod specification 134A of a pod satisfying the criteria specified in one of the container management profile 132C that is associated with executing the pod using compute capacity acquired from the serverless container management service 140, the admission webhook 136 may pass the pod specification 134A to a pod scheduler configured to execute the pod using compute capacity acquired from the serverless container management service 140. Alternatively, based on the pod specification 134A of a pod satisfying the criteria specified in one of the container management profile 132C that is associated with executing the pod using existing compute capacity (without requesting additional compute capacity from the serverless container management service 140), the admission webhook 136 may pass the pod specification 134A to a pod scheduler configured to execute the pod using existing compute capacity (e.g., compute capacity that belongs to the administrator associated with the pod and/or the matching container management profile).

In some embodiments, the admission webhook 136 causes the pod to be executed using compute capacity acquired from the serverless container management service 140 by mutating or updating a field in the pod specification 134A, which indicates the scheduler to be used to schedule the pod, from a default scheduler to a scheduler configured to execute the pod using compute capacity acquired from the serverless container management service 140. In some cases, the user submitting the pod specification 134A to the controller orchestration service 130 cannot change the value of the field (e.g., to a value different from the default value). In other cases, the user submitting the pod specification 134A to the controller orchestration service 130 can leave the field at a default value or set the field to another value prior to submitting the pod specification 134A.

In addition, the admission webhook 136 may determine whether the pod has any requirements that would render the pod incompatible with on-demand compute capacity acquired from the serverless container management service 140. If the admission webhook 136 determines that the pod specification 134A indicates the pod is incompatible with on-demand compute capacity acquired from the serverless container management service 140, the admission webhook 136 may cause the pod to be executed using compute capacity (e.g., currently available or available at a later time) of the user associated with pod.

The pod scheduler 138 assigns a pod to a node (or other forms of compute capacity) such that the node agent running on the node can execute the pod. When the pod scheduler 138 detects a pod that is not assigned to any node, the pod scheduler 138 tries to find the best node on which to run the pod. The pod scheduler 138 may reach the decision of placing which pods on which nodes by taking one or more scheduling principles into account. For example, factors taken into account for pod scheduling decisions may include individual and collective resource requirements of the container(s) in the pod, hardware constraints, software constraints, policy constraints, affinity and anti-affinity specifications, data locality, inter-workload interference, and so on.

In some embodiments, the pod scheduler 138 filters existing nodes to identify a subset of feasible nodes that are consistent with the requirements of the pod and/or the requirements of the container(s) in the pod, and assigns the pod to a node selected from the feasible nodes. The node may be selected from a pool of virtual machine instances and/or bare-metal instances that belong to a specific user account of the hosted computing network 120. For example, the pod scheduler 138 may select a node from a pool of instances assigned to the user account that was used to set up the container management profile 132C matching the information specified in the pod specification 134A. As another example, the pod scheduler 138 may select a node from a pool of instances assigned to the user account that is identified in the pod execution request or otherwise associated with the pod.

In other embodiments, the pod scheduler 138 transmits a node provisioning request to the serverless container management service 140 to provision a node that is customized according to the requirements of the pod and/or the requirements of the container(s) in the pod such that the pod can be assigned to the node. The node can be a virtual machine instance or a bare-metal instance. Although virtual machine instances and bare-metal instances are used as examples, the compute capacity that can be used is not limited to these two types of instances and may include other forms of compute capacity such as micro virtual machines (microVMs), which are lightweight virtual machines pre-provisioned on bare-metal instances.

The pod scheduler 138 may periodically monitor all the pods received by the container orchestration service 130 in order to identify a pod having an indication (which may be, for example, in the pod execution request received from a user or in the pod specification associated with the pod) that the pod is to be executed using on-demand compute capacity acquired from the serverless container management service 140. When the pod scheduler 138 identifies such a pod, the pod scheduler 138 determines the resource requirements (e.g., the amount of CPU, memory, storage, and networking resources to be allocated to the compute capacity) and network requirements (e.g., the subnets on which the pod should be executed) based on, for example, the pod specification 134A associated with the pod.

As described above, the pod scheduler 138 may request the serverless container management service 140 to acquire compute capacity that can be used to execute the pod. In some embodiments, the pod scheduler 138 may transmit a code execution request (or a task execution request) to the serverless container management service 140 to execute a task configured to set up the compute capacity acquired by the serverless container management service 140 such that the compute capacity can be associated with the pod and begin executing the pod. For example, the task may include a node agent, which, once executed on a virtual machine instance acquired by the serverless container management service 140, may communicate to the API server 134 that the virtual machine instance is ready to be associated with the pod and being executing the pod and/or join a cluster of nodes associated with the user of the container orchestration service 130. The pod scheduler 138 may detect that the virtual machine instance has joined the cluster of the user, cause the pod to be assigned to the virtual machine instance, and cause the pod to be executed on the virtual machine instance. When the execution of the pod is completed, the underlying compute capacity that was used to execute the pod also terminates.

The request generated by the pod scheduler 138 may include (or include a pointer to) a task definition specifying the information needed to instantiate the container(s) associated with the task. The information may include, for example, a set of resource parameters (e.g., a CPU specification, a memory specification, a network specification, and/or a hardware specification), a container image (e.g., an image or snapshot of a previously instantiated container or as an image specification that may be used to instantiate an image). An image specification and/or an image may be specified by the container orchestration service 130, the customer of the container orchestration service 130, or by some other entity. Additional non-limiting details regarding tasks, task definitions, and task executions are described in Applicant's Patent App. Pub. Nos. US 2017/0339158, US 2018/0088993, and US 2019/0108049, each of which is incorporated herein by reference in its entirety.

According to embodiments of the present disclosure, in order to execute a first program code (e.g., a pod) on service-managed compute capacity (e.g., managed by the serverless container management service 140) instead of user-managed compute capacity (e.g., managed by the user associated with the pod), the pod scheduler 138 may generate a request to execute a second program code on the serverless container management service 140 using on-demand compute capacity acquired by the serverless container management service 140. The execution of the second program code (e.g., node agent, different from the pod) configures the compute capacity such that the compute capacity can be used to execute the first program code (e.g., the pod received by the container orchestration service 130).

Advantageously, this nested launch of code executions enables execution of program codes (e.g., KUBERNETES pods) using service-managed compute capacity, which is unavailable in some implementations of third party, container orchestrators. In some embodiments, the nested launch is selectively performed based on the criteria specified by the user in the container management profile(s) 132C.

In some embodiments, the pod scheduler 138 refers to a pre-registered task definition in its code execution request to the serverless container management service 140. The code execution request may also include override fields that override any fields appearing in the pre-registered task definition. For example, the pod scheduler 138 may calculate the resource requirements of a pod, and specify the resource requirements in the code execution request such that any default resource specifications in the pre-registered task definition are replaced with the resource requirements included in the code execution request. The pod scheduler 138 may determine the resource requirements based on (i) the resource requirements specified in the pod specification 134A, (ii) additional information in the pod specification 134A about the execution of the pod such as whether some or all of the containers in the pod are executed in series or in parallel, and (iii) the resource requirements associated with the agents that facilitate the execution of the pod, such as, for example, the initializer, the network proxy, the node agent, and the container runtime illustrated in FIG. 1. In addition to resource requirements, the override fields included in the code execution request may also include network settings, security settings, permissions, and the like. For example, the pod specification 134A may indicate that the pod is to be executed using compute resources in a specific region or availability zone. Based on such indication, the pod scheduler 138 may include the specific region or availability zone in the code execution request transmitted to the serverless container management service 140.

The pre-registered task definition may include a static or default definition of the agents (e.g., KUBERNETES agents) to be executed using the compute capacity acquired by the serverless container management service 140 as part of a task, where the agents can then process the pod specification associated with the pod and launch the pod. The agents may include, for example, the initializer, the network proxy, the node agent, and the container runtime illustrated in FIG. 1. In addition to pre-registering the task definition, the container image used to load the agents may also be pre-registered with the container orchestration service 130 (e.g., prior to receiving the pod specification 134A associated with the pod) so that the pod scheduler 138 can simply refer to the pre-registered image in the code execution request transmitted to the serverless container management service 140.

In some embodiments, the pods and the nodes maintain a one-to-one relationship such that a given pod can only be assigned to one node, and a given node can only run one pod. In such embodiments, after a pod is assigned to a given node, the pod scheduler 138 is prevented from assigning additional pods to the given node. In other embodiments, multiple pods can run on a single node.

In some embodiments, the compute capacity acquired by the serverless container management service 140 in response to multiple code execution requests from the pod scheduler 138 belongs to a single account on the hosted computing network 120 that belongs to the container orchestration service 130. In other embodiments, the compute capacity acquired by the serverless container management service 140 in response to multiple code execution requests from the pod scheduler 138 is spread across multiple accounts on the hosted computing network 120 that belong to the container orchestration service 130. In yet other embodiments, the compute capacity acquired by the serverless container management service 140 in response to multiple code execution requests from the pod scheduler 138 belongs to the respective accounts on the hosted computing network 120 of the owners of the pods.

Although a single pod scheduler is shown in FIG. 1, in other embodiments, the container orchestration service 130 includes multiple pod schedulers. In such embodiments, the container orchestration service 130 may include one pod scheduler for identifying a node from existing nodes and assigning an incoming pod to the identified node, and another pod scheduler for requesting the serverless container management service 140 to create a new node and assigning an incoming pod to the newly created node. Another component of the container orchestration service 130 (e.g., the admission webhook 136) may determine which one of these two (or more) pod schedulers should be used to schedule the incoming pod, for example, based on the pod specification 134A and/or the container management profiles 132C. Additionally, although certain implementation-specific terms such as pod, pod specification, and pod scheduler are used in the example of FIG. 1, embodiments of the present disclosure are not limited to such examples and may be applied to other implementations. For example, in other embodiments, a pod may be replaced with another unit of execution (e.g., a basic execution unit in a non-KUBERNETES framework), a pod specification may be replaced with another data or metadata indicating one or more parameters for executing the unit of execution, and a pod scheduler may be replaced with another entity that can assign the unit of execution to compute capacity. In other embodiments, one or more components shown in FIG. 1 may be omitted, and/or one or more additional components not shown in FIG. 1 may be included.

With continued reference to FIG. 1, the serverless container management service 140 may be a collection of computing resources that operate collectively to process task definitions to perform tasks as described herein by providing and managing container instances where the tasks and the associated containers can be executed. The computing resources configured to process task definitions and provide and manage container instances where the tasks and the associated containers can be executed include at least one of: computer systems (the computer systems including processors and memory), networks, storage devices, executable code, services, processes, modules, or applications. The computing resources configured to process task definitions and provide and manage container instances where the tasks and the associated containers can be executed may include virtual systems that are implemented on shared hardware hosted by, for example, a computing resource service provider, internal or external to the hosted computing network 120. The serverless container management service 140 may be implemented as a single system or may be implemented as a distributed system, with a plurality of instances operating collectively to process task definitions and provide and manage container instances where the tasks and the associated containers can be executed. The serverless container management service 140 receives task definitions, instantiates container instances, communicates with container instances, and/or otherwise manages container instances.

As described herein, the instance 142 can be a virtual machine instance or a bare-metal instance. In the example of FIG. 1, the instance 142 includes an initializer 142A, a network proxy 142B, a node agent 142C, a container runtime 142D, a pod 142E, and an instance manager 144. The initializer 142A is a container configured to initialize the compute capacity (e.g., instance 142) acquired by the serverless container management service 140 using information passed from the pod scheduler 138, and initiate the network proxy 142B and the node agent 142C. The network proxy 142B is a network proxy that load-balances service requests to the containers running on the instance 142. The node agent 142C registers the compute capacity with the API server 134 and executes the containers that are scheduled to the compute capacity by the pod scheduler 138. The container runtime 142D is software that executes containers and manages container images on a node. DOCKER® software is the most common container runtime software used in a KUBERNETES pod, but pods support other container runtimes software as well.

The pod 142E may be a program code (or collection of program codes) requested to be executed based on a code execution request received by the container orchestration service 130. As described in connection with at least one embodiment herein, a pod is the basic execution unit of a KUBERNETES application, the smallest and simplest unit in the KUBERNETES object model that can be created or deployed. A pod represents processes to be executed on the compute capacity acquired or selected by the container orchestration service 130. A pod may encapsulate an application's container (or, in some cases, multiple containers), storage resources, a unique network IP address, and options that govern how the container(s) should be executed.

The instance manager 144 may configure the compute capacity acquired by the serverless container management service 140 (e.g., configure network namespaces, security groups, runtimes, and the like). The execution controller 146 may process requests from the container orchestration service 130 such as requests to execute a task on an instance provisioned and/or acquired by the serverless container management service 140, acquire compute capacity that can be used to execute such a task, and initiate the instance manager 144 on the acquired compute capacity.

The execution controller 146 can also configure one or more network interfaces when the instance 142 is provisioned to execute an incoming task. Such network interfaces can be used to provide a communication channel between the user and the task (e.g., to monitor the status of the task and/or to receive results), between the task and one or more services of the computing resource service provider, or to connect the instance 142 to a virtual network of the user. In an embodiment, the virtual network of the user is a virtual private network, provided to the user by the hosted computing network 120 and isolated from the virtual private networks of other users of the hosted computing network 120. The techniques for specifying and configuring such network interfaces are described in greater detail below with reference to FIGS. 5-7.

In addition to the components illustrated in FIG. 1, the hosted computing network 120 can additionally include domain name services ("DNS") servers, block storage servers, object storage servers, and other server configurations for supporting the container orchestration service 130 and/or the serverless container management service 140. Each server may include hardware computer memory and/or processors, an operating system that provides executable program instructions for the general administration and operation of that server, and a computer-readable medium storing instructions that, when executed by a processor of the server, allow the server to perform its intended functions.

As described above, the hosted computing network 120 can be provided across a number of geographically separate regions, for example, to provide users with lower latencies by having their virtual computing devices in or near their geographic location. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more physical servers implementing the container orchestration service 130 and/or the serverless container management service 140. The data centers within an availability zone and the availability zones within a region are connected to one another through private, low-latency links, for example, fiber optic network cables. This compartmentalization and geographic distribution of computing hardware enables the hosted computing network 120 to provide fast service to users on a global scale with a high degree of fault tolerance and stability.

As illustrated in FIG. 1, the hosted computing network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example, desktop computers, laptops, smartphones, tablets, e-readers, gaming consoles, and the like. Users can access the hosted computing network 120 via the network 104 to view or manage their data and computing resources, as well as to use websites and/or applications hosted by the hosted computing network 120.

Example Nested Launch Workflow

Figure 2:
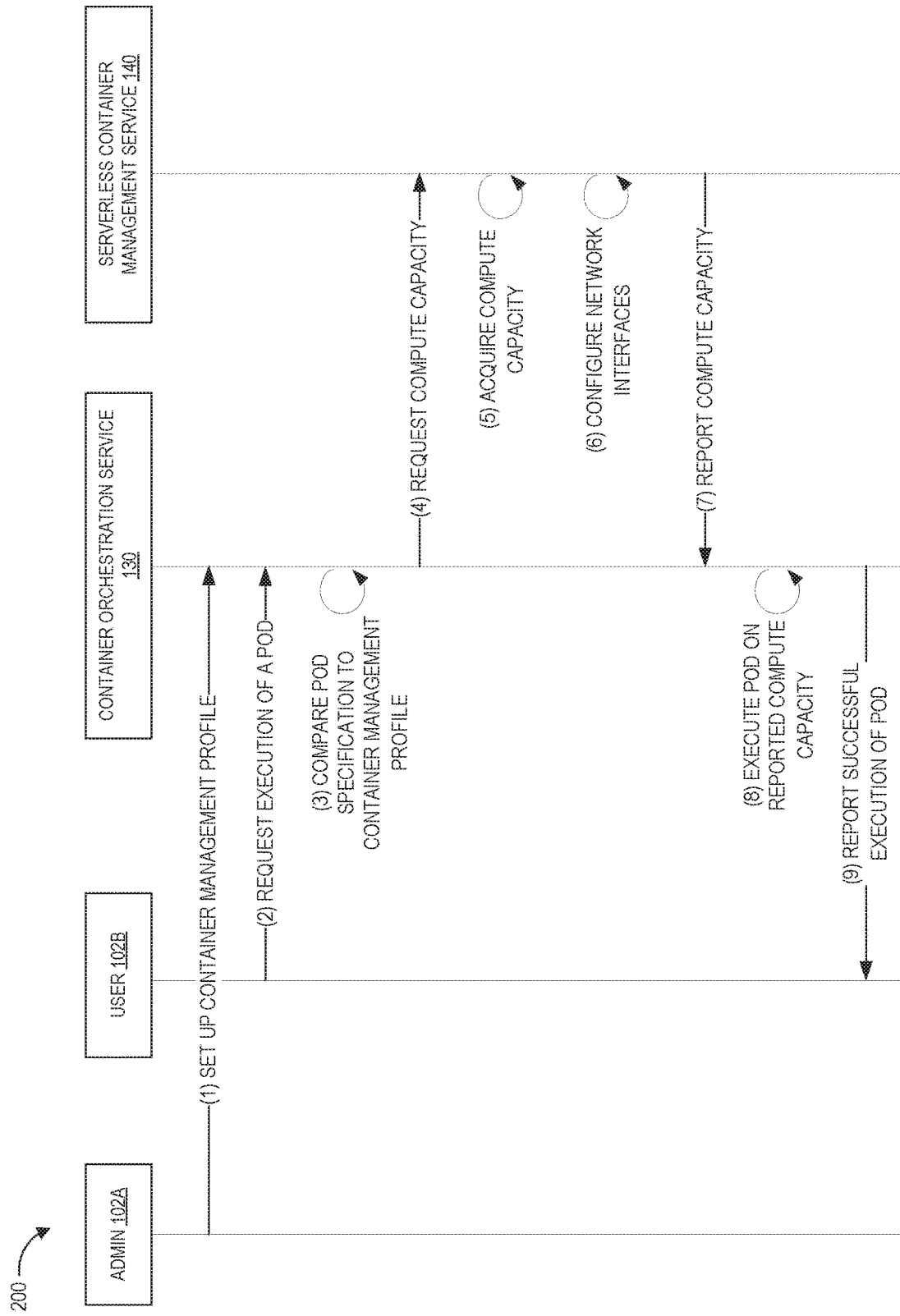
FIG. 2 depicts an example workflow for executing a program code within the hosted computing network of FIG. 1 in accordance with aspects of the present disclosure.

FIG. 2 depicts a flow diagram 200 that shows interactions among the various components shown in FIG. 1 in performing a nested launch of program codes in accordance with aspects of the present disclosure. As shown in FIG. 2, at (1), an administrator 102A sets up a container management profile, specifying the criteria for processing and scheduling a pod. Then, at (2), a user 102B submits a request to execute a pod on the container orchestration service 130. At (3), the container orchestration service 130 compares the pod specification associated with the pod with the container management profile previously set up by the administrator 102A. In response to determining that the pod should be executed using compute capacity acquired from the serverless container management service 140, at (4), the container orchestration service 130 requests compute capacity from the serverless container management service 140. For example, the container orchestration service 130 may send a request to execute one or more program codes (e.g., tasks, processes, applications, etc.) to the serverless container management service 140. As discussed herein, such a request sent to the serverless container management service 140 may indicate one or more parameters to be used for acquiring and configuring the compute capacity as well as indicate one or more program codes to be executed. In some cases, the one or more program codes are different from the pod (or another type of execution unit) whose execution is requested by a user of the container orchestration service 130. In other cases, the one or more program codes include the pod (or another type of execution unit) whose execution is requested by a user of the container orchestration service 130. The compute capacity requested by the container orchestration service 130 and acquired by the serverless container management service 140 may sometimes be referred to as a task.

At (5), the serverless container management service 140 acquires compute capacity. For example, the serverless container management service 140 may acquire the compute capacity based on, for example, one or more parameters included in or indicated by the request (e.g., a task definition) received from the container orchestration service 130. At (6), the serverless container management service 140 configures one or more network interfaces of the acquired compute capacity, for example, using credential(s) retrieved from the container orchestration service 130 or another entity. At (7), the serverless container management service 140 reports back to the container orchestration service 130 that the compute capacity (e.g., a task, an instance, a node, or another form of compute capacity to be used by the container orchestration service 130 to execute the program code, such as the pod at (2), whose execution is requested by the user of the container orchestration service 130) has been created. In some cases, instead of the serverless container management service 140, one of the program codes or agents running on the acquired compute capacity may report back to the container orchestration service 130.

In response to detecting the node, at (8), the container orchestration service 130 executes the program code, such as the pod at (2), whose execution is requested by the user of the container orchestration service 130. At (9), the container orchestration service 130 reports back to the user 102B (and/or the administrator 102A) the successful execution of the pod. Although not illustrated in FIG. 2, once the pod is done executing, the node on which the pod was executed may terminate, and the underlying compute resources allocated to the node may be de-allocated by the serverless container management service 140.

Example Routine for Processing an Incoming Pod

Figure 3:
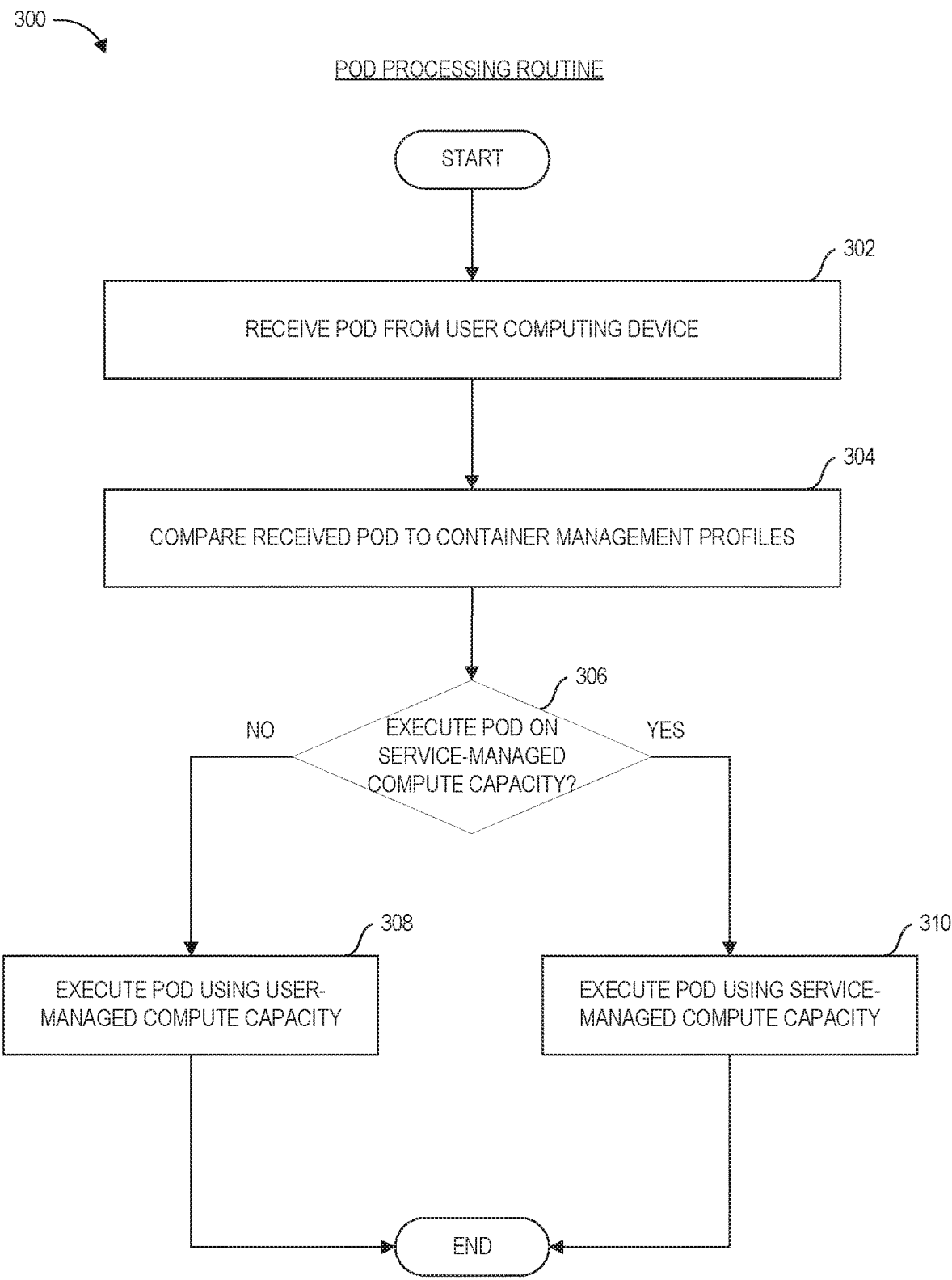
FIG. 3 is a flowchart of an example process for executing a pod in accordance with aspects of the present disclosure.

FIG. 3 depicts an illustrative routine 300 for processing an incoming pod in accordance with aspects of the present disclosure. Although FIG. 3 and the corresponding disclosure uses terminology specific to the KUBERNETES container orchestrator, it will be appreciated that this is for purposes of example and the routine 300 could be used similarly for other third party container orchestrators. It will be appreciated that the cloud provider network may include a service offering that allows customers to use a particular third party container orchestrator within the cloud provider network, however the present disclosure extends those abilities to also enable customers to enjoy serverless container experiences with respect to such third party container orchestrators. The routine 300 may be carried out, for example, by the container orchestration service 130 or one or more other components of the hosted computing network 120 described herein. For convenience, the blocks of routine 300 are described as being performed by a container orchestration service. For example, such a container orchestration service may include one or more hardware computing devices and non-transitory physical computer storage storing instructions that, when executed by the one or more hardware computing devices, cause the one or more hardware computing devices to perform the blocks of the routine 300.

The routine 300 begins at 302, where the container orchestration service receives a pod from a user computing device. For example, a user may submit a request to execute a pod on the container orchestration service, and the request may include (or refer to) a pod specification containing one or more parameters usable to perform the requested execution of the pod.

At block 304, the container orchestration service compares the pod specification associated with the pod to one or more container management profiles that were previously set up and stored on the container orchestration service. A given container management profile may include certain criteria that can be satisfied by the pod specification, and indicate how a pod associated with the pod specification satisfying the criteria should be executed. As discussed herein, the criteria may include whether the pod belongs to a particular namespace, whether the pod specification includes a particular label, and the like.

At block 306, the container orchestration service determines, based on the comparison at 304, whether the pod should be executed using service-managed compute capacity. For example, the container orchestration service may determine that the pod should be executed using service-managed compute capacity based on the pod specification of the pod satisfying the criteria specified by a container management profile, which indicates that pods satisfying its criteria should be executed using service-managed compute capacity (e.g., compute capacity acquired from the serverless container management service 140). The container management profile may indicate that pods satisfying its criteria should be executed using service-managed compute capacity using a flag, where one value indicates that the pods should be executed using service-managed compute capacity and another value indicates that the pods should be executed using user-managed compute capacity (e.g., compute capacity acquired by the user prior to submitting the pod, or compute capacity to be acquired by the user subsequent to submitting the pod if none of the existing compute capacity of the user satisfies the requirements of the pod). Based on a determination that the pod should be executed using service-managed compute capacity, the routine 300 proceeds to block 308. Otherwise, the routine 300 proceeds to block 310.

At block 308, the container orchestration service causes the pod to be executed using user-managed compute capacity. For example, the user may have acquired a cluster of nodes that can be used to execute the pod, and the container orchestration service may select from the cluster of nodes, a node that is best suited for the pod based on the requirements of the pod specified in the pod specification. Then, the container orchestration service causes the pod to be executed on the selected node. The routine 300 may then end.

At block 310, the container orchestration service causes the pod to be executed using service-managed compute capacity. For example, the container orchestration service may send a code execution request to the serverless container management service 140 to acquire compute capacity and execute certain program codes on the acquired compute capacity to configure the compute capacity according to the requirements of the pod. Then, the container orchestration service may pair the pod with the acquired compute capacity (e.g., a node), and cause the pod to be executed on the node. In this example, instead of selecting an existing node that satisfies the requirements of the pod, the container orchestration service creates (via the serverless container management service 140) a node that satisfies the requirements of the pod. The routine 300 may then end.

Example Routine for Scheduling a Pod

Figure 4:
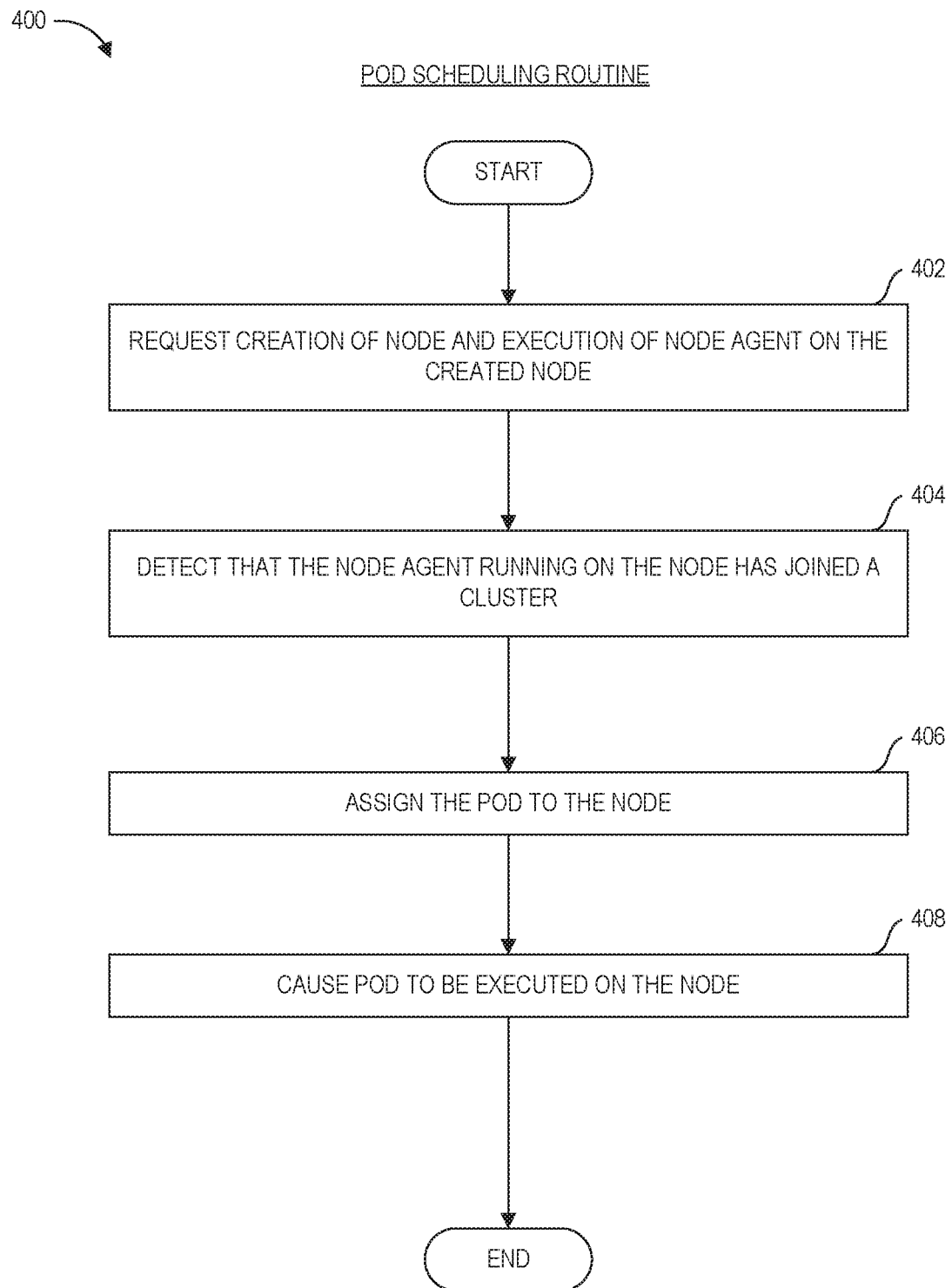
FIG. 4 is a flowchart of an example process for scheduling a pod in accordance with aspects of the present disclosure.

FIG. 4 depicts an illustrative routine 400 for scheduling a pod to a node in accordance with aspects of the present disclosure. The routine 400 may be carried out, for example, by the container orchestration service or one or more other components of the hosted computing network 120 described herein. For convenience, the blocks of routine 400 are described as being performed by a container orchestration service. For example, such a container orchestration service may include one or more hardware computing devices and non-transitory physical computer storage storing instructions that, when executed by the one or more hardware computing devices, cause the one or more hardware computing devices to perform the blocks of the routine 400.

The routine 400 begins at 402, where the container orchestration service, in response to determining that a pod should be executed using service-managed compute capacity, requests creation of a node and execution of a node agent on the created node. For example, the container orchestration service may request a serverless container management service such as the serverless container management service 140 to acquire compute capacity to be used as a node for executing a pod, and to execute a node agent on the acquired compute capacity. In some embodiments, the request sent to the serverless container management service 140 does not include the pod or the pod specification or identify the pod to be executed on the acquired compute capacity.

At block 404, the container orchestration service detects that the node agent running on the node created by the serverless container management service 140 has joined a cluster usable to execute the pod. For example, after the serverless container management service 140 acquires compute capacity and executes the node agent on the compute capacity, the node agent may join a network visible to the container orchestration service 130 and communicate to the API server 134 that the compute capacity on which the node agent is executing is ready to be used to execute a pod.

At block 406, the container orchestration service assigns the pod to the node on which the node agent is executing. In addition to assigning the pod to the node, the container orchestration service may prevent additional pods from being scheduled to the node, in order to maintain a one-pod-per-one-node relationship for service-managed compute capacity. In some embodiments, each service-managed node provides hardware isolation from other service-managed nodes.

At block 408, the container orchestration service causes the pod to be executed on the node. Once the pod finishes executing, the container orchestration service may decouple the pod from the node and/or cause the node to be terminated to free up the underlying compute resources. The routine 300 may then end.

Example Network Interfaces Attached to the Instance

Figure 5:
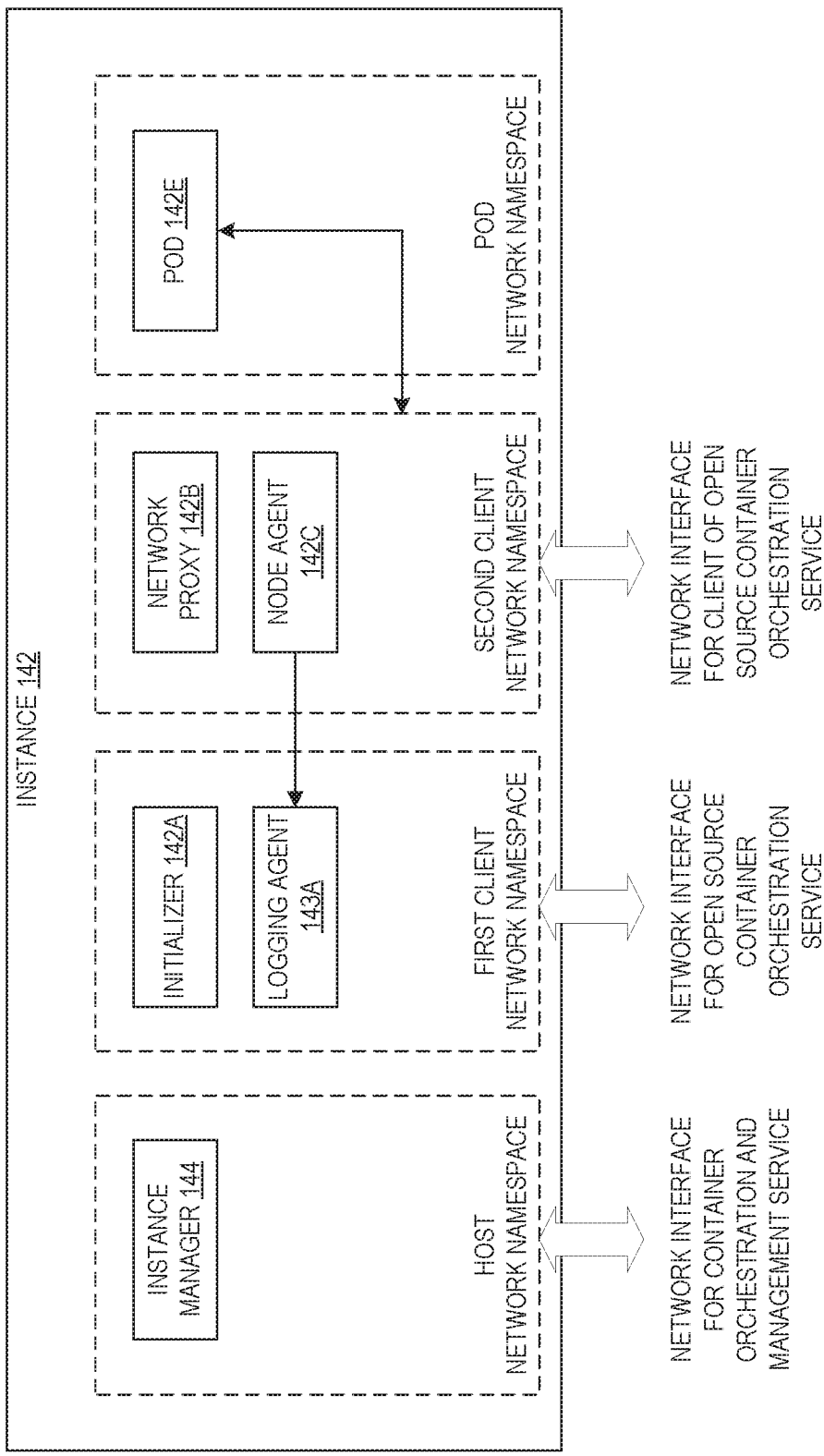
FIG. 5 is a block diagram illustrating an example network interface configuration of compute capacity in accordance with aspects of the present disclosure.

FIG. 5 depicts an example block diagram illustrating the network interfaces attached to the instance 142 of FIG. 1. As shown in FIG. 5, the instance 142 includes a host network namespace including the instance manager 144, a first client network namespace including the initializer 142A and a logging agent 143A (e.g., for publishing the log files of the node agent 142C), a second client network namespace including the network proxy 142B, the node agent 142C, and a bridge 143B (e.g., for accessing the pod 142E and connecting the pod 142E to the network interface of the node agent 142C), and a pod network namespace including the pod 142E. The host network namespace is attached to a network interface for the serverless container management service 140, the first client network namespace is attached to a network interface for the container orchestration service 130, and the second client network namespace is attached to a network interface for a client of the container orchestration service 130. Although the instance 142 is used as an example, the techniques described herein can be applied to other types of compute capacity such as a microVM or a container. In some embodiments, the host network namespace and the first client network namespace are merged into a single network namespace, and the pod network namespace and the second client network namespace are merged into a single network namespace. In some of such embodiments, the components shown in FIG. 5 as executing on the instance 142 are instead executed on a microVM.

As discussed above, in some conventional single-network-interface implementations, users are able to request configuration of only their own network interfaces. However, in some cases, such users (e.g., the container orchestration service 130) may be requesting on-demand compute capacity from the serverless container management service 140 on behalf of their own customers, and may wish to allow the program code being executed on the acquired compute capacity to access not only the network resources of the container orchestration service 130 but also its customer's network resources as well (e.g., network resources of the owner of the program code).

Advantageously, as shown in FIG. 5, embodiments of the present disclosure provide a mechanism for specifying multiple network interfaces to be configured for given compute capacity and for obtaining the credentials needed to configure the multiple network interfaces. By allowing a user to specify multiple network interfaces (e.g., a network interface via which the user's network resources can be accessed as well as another network interface via which the user's customer's network resources can be accessed), the serverless container management service 140 can facilitate the usage of its on-demand compute capacity not only by direct users but also by container orchestrators and other services that service their own users. Further, the serverless container management service 140 allows multiple sets of different network resources to be attached to a single instance (or other types of compute capacity) such that different program codes executing in the instance may be allowed access to different virtual private networks and different sets of network resources.

For example, the container orchestration service 130 may specify, in its code execution request to the serverless container management service 140, that multiple network interfaces are needed for the requested compute capacity. In response, the serverless container management service 140 can identify the multiple network interfaces, determine the credential to be used to configure each of the multiple network interfaces, and attach the multiple network interfaces to the compute capacity acquired on behalf of the container orchestration service 130. During execution, the code running inside the compute capacity can utilize the multiple network interfaces as specified by the owner of the code (e.g., the customer of the container orchestration service 130).

In some embodiments, the multiple network interfaces are specified in the task definition associated with the code execution request sent to the serverless container management service 140. For example, one or more of such network interfaces may belong to the container orchestration service 130, and thus, may be configurable using the credentials associated with the container orchestration service 130. In addition, one or more other ones of such network interfaces may belong to the users of the container orchestration service 130, and thus, be configurable using the credentials of the respective users of the container orchestration service 130.

In some embodiments, a user of the container orchestration service 130 may specify, in a container management profile 132C, a list of network addresses within the virtual private network associated with the user's account in which the user wants the pod to be launched.

Based on this information, the container orchestration service 130 specifies, in its code execution request to the serverless container management service 140, information needed to configure the user's network interface (e.g., the list of network addresses within the virtual private network associated with the user's account) in addition to the information needed to configure the network interface of the container orchestration service 130. Other information that may be included in the task definition or in the code execution request to the serverless container management service 140 for setting up the network interfaces includes: security group information, whether a public IP address should be configured, and the credentials needed to set up the network interface (or where to obtain such credentials). Where the network interfaces belong to two (or any number of) separate accounts of the hosted computing network 120, two (or a corresponding number of) sets of credentials may be provided to the serverless container management service 140.

In some embodiments, the serverless container management service 140 stores these network interface configuration parameters provided by the container orchestration service 130 in task metadata, and makes the task metadata accessible to any program code running inside the task. The program code may query the task metadata endpoint to discover information about the network interfaces, such as their subnets, MAC addresses, IP address of the default gateway, and so on. By accessing the task metadata, the process running inside the compute capacity (e.g., instance 142) and tasked with configuring the network interfaces (e.g., the instance manager 144 and/or the initializer 142A) can discover which network interface should be attached to the container orchestration service 130, and which network interface is attached to the subnets of the customer of the container orchestration service 130 and the customer's virtual private network, and configure the network interfaces accordingly.

In the example of FIG. 5, at the time the instance 142 is first provisioned and the instance manager 144 is executed on the instance 142, the host network namespace may be the only network namespace that has been created. The instance manager 144 may create the other network namespaces and initiate the other components shown in FIG. 5. For example, the instance manager 144 may create the first client network namespace and cause the initializer 142A to be executed. The initializer 142A can then create the second client network namespace shown in FIG. 5 and initiate the network proxy 142B and the node agent 142C in the second client network namespace.

The serverless container management service 140 may execute multiple API calls in parallel (e.g., to an instance provisioning service within the hosted computing network 120) to set up the multiple network interfaces. In other embodiments, the serverless container management service 140 sets up the multiple network interfaces one at a time or makes a single API call to set up all of the multiple network interfaces.

In some embodiments, the serverless container management service 140 assumes that, unless otherwise indicated, the entity sending the code execution request (e.g., the orchestration service 130) owns all of the multiple network interfaces and uses the credentials of the entity to set up all of the network interfaces. If the code execution request indicates that one or more of the multiple network interfaces to be attached to the compute capacity belongs to an entity other than the caller (e.g., the orchestration service 130), the serverless container management service 140 requests the caller (or a credential vending service associated with the caller) to provide the credentials to be used to set up such network interfaces. In other embodiments, the code execution request received by the serverless container management service 140 includes all of the credentials needed to set up all of the requested multiple network interfaces. In some embodiments, the orchestration service 130 accesses or creates a set of credentials to be used to set up its customer's network interface and provides the set of credentials to the serverless container management service 140, rather than having the serverless container management service 140 directly access or create those credentials.

The code execution request received by the serverless container management service 140 may also indicate which container(s) in the task should be associated with which network interface(s). For example, if the task definition associated with the code execution request incudes Container A and Container B, and the code execution request indicates that Container A should be configured to use Network Interface X, and that Container B should be configured to use Network Interface Y, the serverless container management service 140 configures the compute capacity accordingly such that processes running in Container A have access to Network Interface X but not to Network Interface Y, and processes running in Container B have access to Network Interface Y but not to Network Interface X.

In some embodiments, the serverless container management service 140 restricts the access given the processes running in some of the network namespaces. For example, the serverless container management service 140 may configure the second client network namespace (and/or the pod network namespace) such that the processes running therein cannot access the instance metadata associated with the instance 142.

Example Routine for Processing a Task Execution Request

Figure 6:
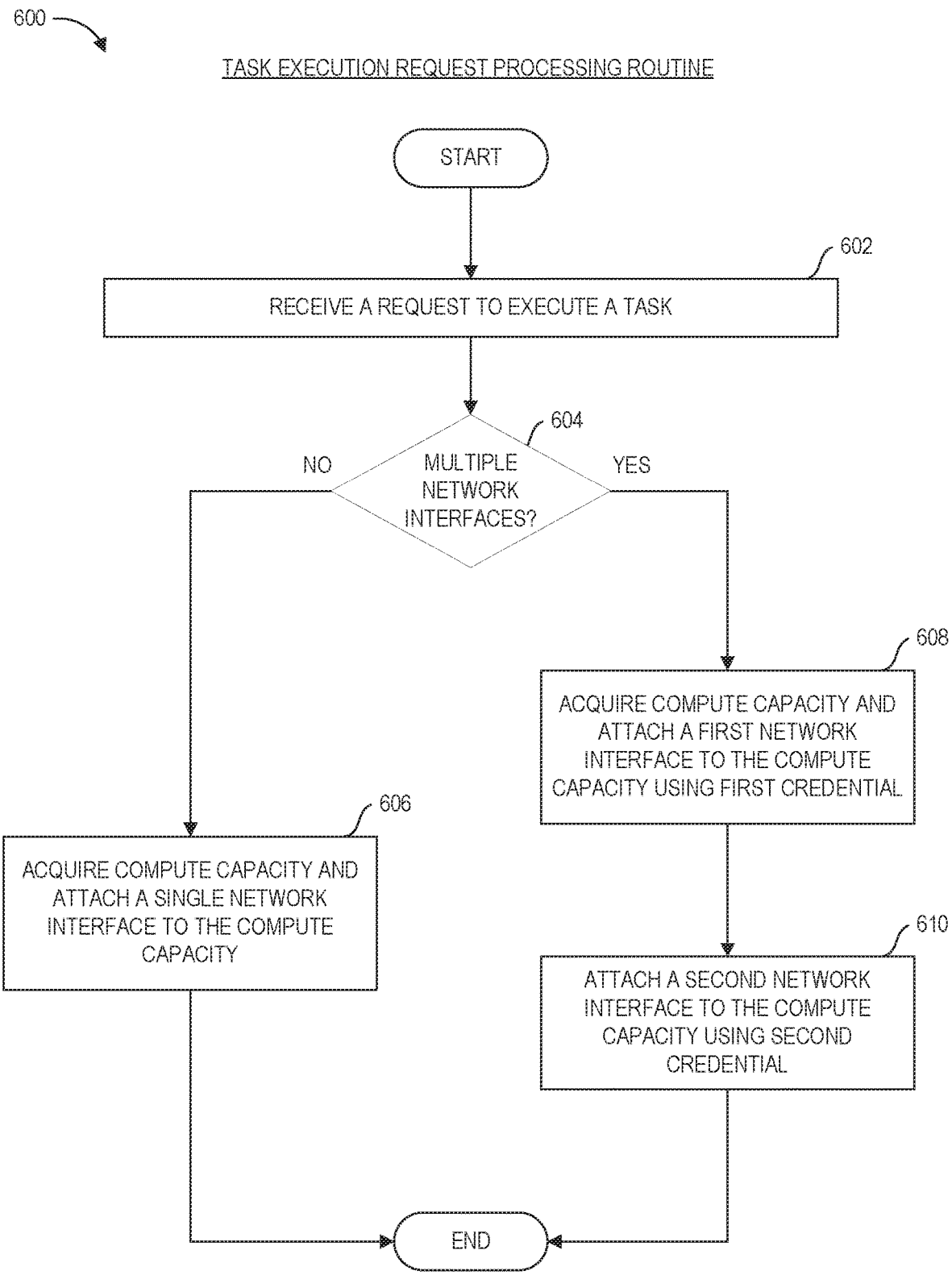
FIG. 6 is a flowchart of an example process for processing a task execution request in accordance with aspects of the present disclosure.

FIG. 6 depicts an illustrative routine 600 for processing a task execution request in accordance with aspects of the present disclosure. The routine 600 may be carried out, for example, by the serverless container management service 140 or one or more other components of the hosted computing network 120 described herein. For convenience, the blocks of routine 600 are described as being performed by a serverless container management service. For example, such a serverless container management service may include one or more hardware computing devices and non-transitory physical computer storage storing instructions that, when executed by the one or more hardware computing devices, cause the one or more hardware computing devices to perform the blocks of the routine 600.

The routine 600 begins at 602, where the serverless container management service receives a request to execute a task using compute capacity acquired by the serverless container management service. For example, the task may include one or more processes needed to configure a node so that the node can be used to execute a containerized application (e.g., a KUBERNETES pod).

At block 604, the serverless container management service determines whether the requested task execution requires multiple network interfaces to be configured. For example, the request may specify configuration information for multiple network interfaces, and specify which processes of the task should be connected to which one of the multiple network interfaces. If the serverless container management service determines that the requested task execution does not require multiple network interfaces to be configured, the routine 600 proceeds to block 606. Otherwise, the routine 600 proceeds to block 608.

At block 606, the serverless container management service acquires compute capacity and attaches a single network interface to the acquired compute capacity. The serverless container management service may assume, unless otherwise indicated by the request, that the credential of the sender of the request (e.g., the orchestration system 130) should be used to configure the single network interface.

At block 608, the serverless container management service acquires compute capacity and attaches a first network interface to the acquired compute capacity using the credential of the sender of the request (e.g., the orchestration system 130). For example, the request may specify the credential of the sender of the request, or the sender of the request may provide its credential upon request by the serverless container management service.

At block 610, the serverless container management service attaches a second network interface to the acquired compute capacity using a second credential (e.g., credential associated with a user of the sender of the request (e.g., a user of the orchestration system 130). For example, the request may specify the credential of this user, or the sender of the request may provide this user's credential upon request by the serverless container management service. The routine 600 may then end.

Although not shown in FIG. 6, subsequent to block 606 and block 610, the serverless container management service may cause the requested task to be executed on the acquired compute capacity having the network interface(s) attached thereto.

Example Routine for Acquiring Credentials for Network Interface Configuration

Figure 7:
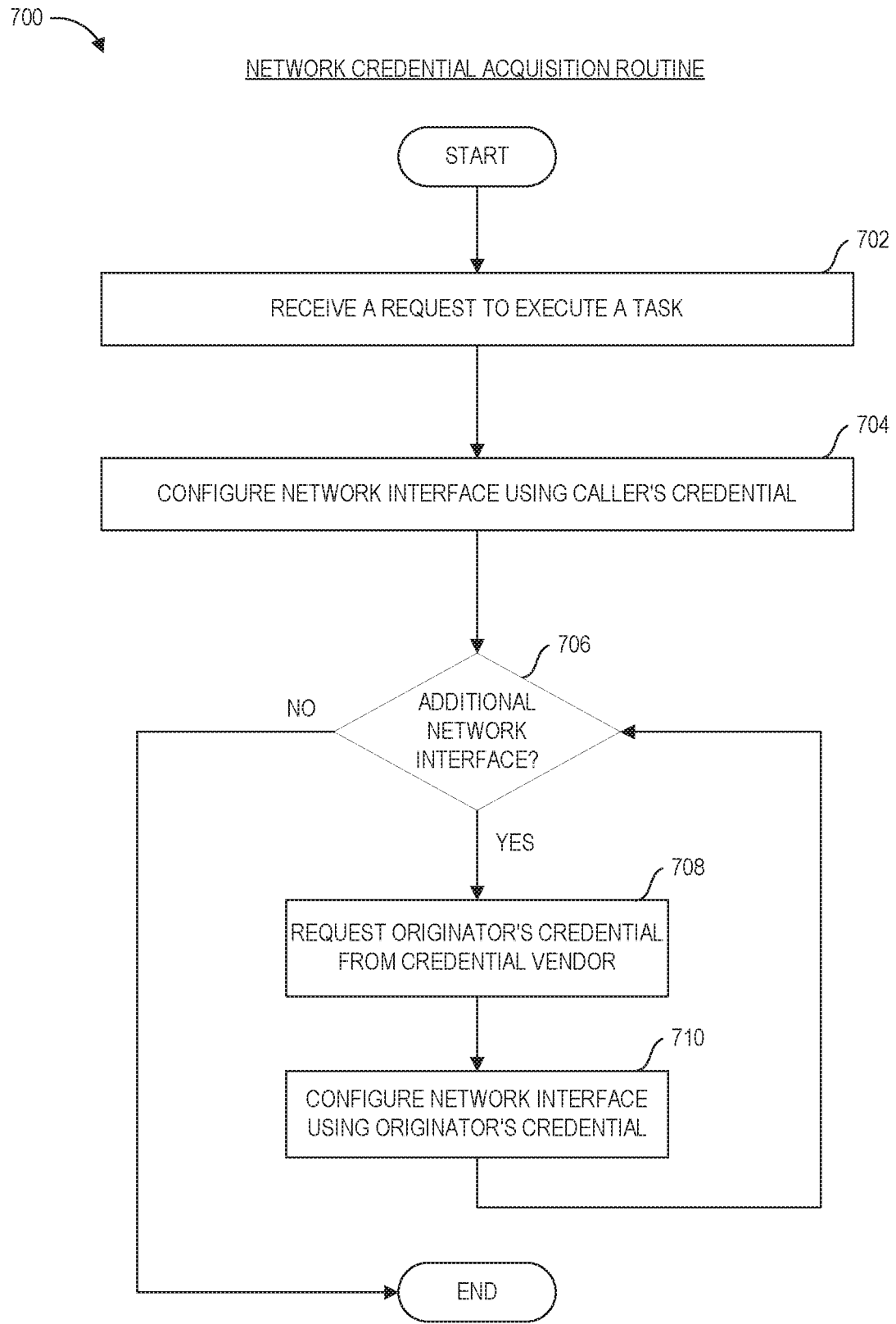
FIG. 7 is a flowchart of an example process for acquiring credentials usable to configure network interfaces in accordance with aspects of the present disclosure.

FIG. 7 depicts an illustrative routine 700 for acquiring credentials for configuring network interfaces in accordance with aspects of the present disclosure. The routine 700 may be carried out, for example, by the serverless container management service 130 or one or more other components of the hosted computing network 120 described herein. For convenience, the blocks of routine 700 are described as being performed by a serverless container management service. For example, such a serverless container management service may include one or more hardware computing devices and non-transitory physical computer storage storing instructions that, when executed by the one or more hardware computing devices, cause the one or more hardware computing devices to perform the blocks of the routine 700.

The routine 700 begins at 702, where the serverless container management service receives a request to execute a task using compute capacity acquired by the serverless container management service. For example, the task may include one or more processes needed to configure a node so that the node can be used to execute a containerized application (e.g., a KUBERNETES pod).

At block 704, the serverless container management service configures one or more network interfaces using the caller's credential. The caller may be the caller system such as the container orchestration service 130 that transmitted the request to the serverless container management service at block 702. For example, the request at block 702 may include the caller's credential. As another example, the serverless container management service may already possess the caller's credential. As yet another example, the caller provides its credential upon request from the serverless container management service. Subsequent to configuring the caller's network interface(s), the routine 700 proceeds to block 706 to check for additional network interfaces.

At block 706, the serverless container management service determines whether an additional network interface needs to be configured. For example, the request received at block 702 may specify one or more multiple network interfaces in addition to a caller's network interface, and the serverless container management service may identify one of the multiple network interfaces that has not yet been configured. If the serverless container management service determines that there is no additional network interface needing to be configured, the routine 700 ends. Otherwise, the routine 700 proceeds to block 708.

At block 708, the serverless container management service requests the originator's credential from a credential vending service associated with the caller. For example, the originator may be a user of the caller system on behalf of whom the caller system has requested the serverless container management service to execute the task (e.g., so that the compute capacity acquired by the serverless container management service can subsequently be used to execute a pod provided by the originator). Although the originator's credential is used in the example of routine 700, in other embodiments, the credential of any other user or account may be used to configure the additional user network interface(s). Some or all of the additional network interfaces may belong to different users or accounts.

At block 710, the serverless container management service configures the network interface using the originator's credential obtained from the credential vending service. The routine 700 may then return to block 706, and if no additional network interface needs to be configured, the routine 700 may then end.

Although in the example of FIG. 7, the network interfaces are configured one at a time, in other embodiments, the serverless container management service may identify all of the network interfaces to be configured on behalf of a task execution request and attach the network interfaces to the acquired compute capacity in parallel. Additionally, after the routine 700 ends, the serverless container management service may cause the requested task to be executed on the acquired compute capacity having the network interface(s) attached thereto.

Example Architecture of Container Orchestration Service

Figure 8:
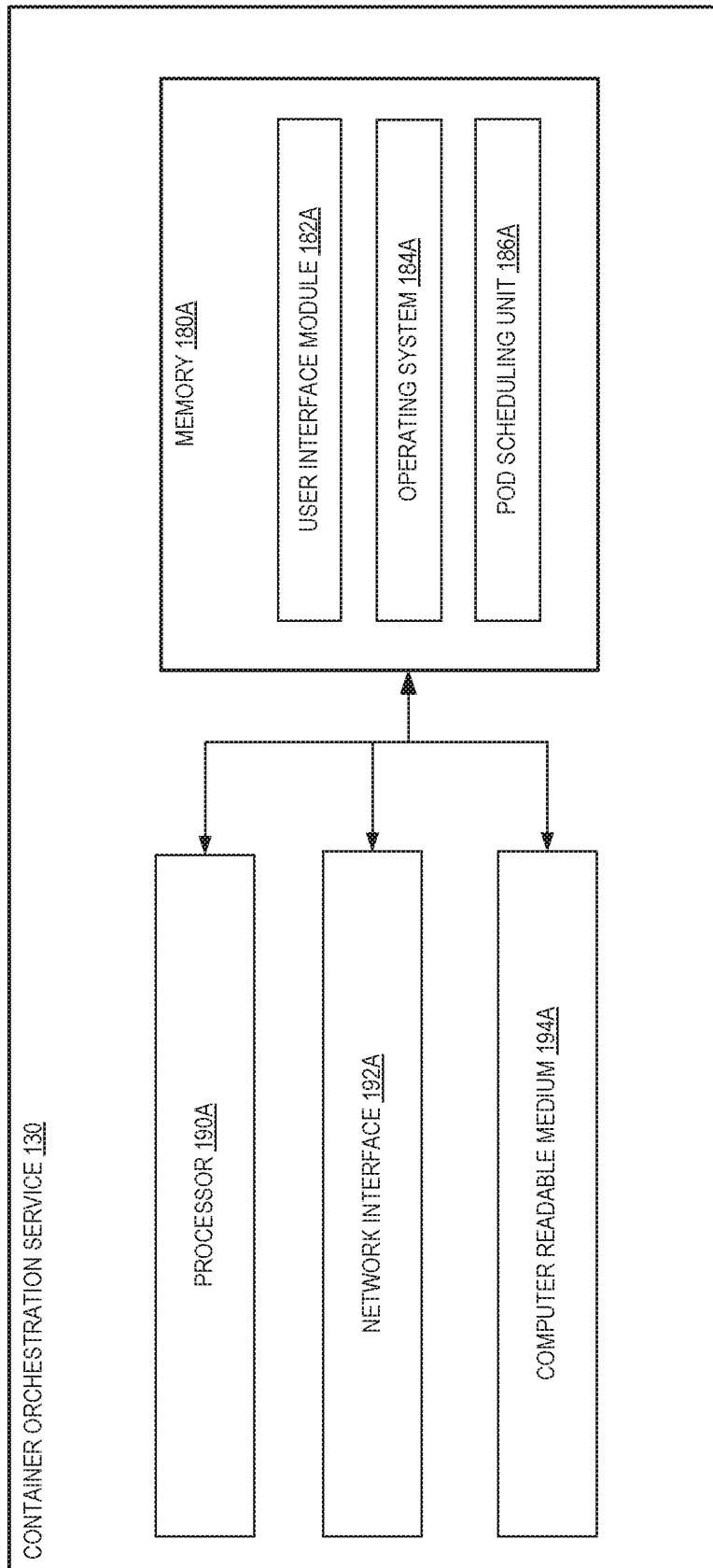
FIG. 8 depicts a general architecture of a computing device or system providing a container orchestration service in accordance with aspects of the present disclosure.

FIG. 8 depicts an example architecture of a computing system (referred to as the container orchestration service 130) that can be used to perform one or more of the techniques described herein or illustrated in FIGS. 1-7. The general architecture of the container orchestration service 130 depicted in FIG. 8 includes an arrangement of computer hardware and software modules that may be used to implement one or more aspects of the present disclosure. The container orchestration service 130 may include many more (or fewer) elements than those shown in FIG. 8. It is not necessary, however, that all of these elements be shown in order to provide an enabling disclosure. As illustrated, the container orchestration service 130 includes a processor 190A, a network interface 192A, and a computer readable medium 194A, all of which may communicate with one another by way of a communication bus. The network interface 192A may provide connectivity to one or more networks or computing systems. The processor 190A may thus receive information and instructions from other computing systems or services via the network 104 illustrated in FIG. 1.

The processor 190A may also communicate with memory 180A. The memory 180A may contain computer program instructions (grouped as modules in some embodiments) that the processor 190A executes in order to implement one or more aspects of the present disclosure. The memory 180A may include RAM, ROM, and/or other persistent, auxiliary, or non-transitory computer-readable media. The memory 180A may store an operating system 184A that provides computer program instructions for use by the processor 190A in the general administration and operation of the container orchestration service 130. The memory 180A may further include computer program instructions and other information for implementing one or more aspects of the present disclosure. For example, in one embodiment, the memory 180A includes a user interface module 182A that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180A may include or communicate with one or more data stores.

In addition to and/or in combination with the user interface module 182A, the memory 180A may include a pod scheduling unit 186A that may be executed by the processor 190A. In one embodiment, the pod scheduling unit 186A implements various aspects of the present disclosure, e.g., processing pods, pod specifications, and container management profiles, scheduling pods, generating and sending code execution requests to the serverless container management service 140, detecting newly acquired compute capacity (or nodes), assigning pods to compute capacity acquired by the serverless container management service 140, and executing pods using the acquired compute capacity, and/or other aspects discussed herein or illustrated in FIGS. 1-7.

While the pod scheduling unit 186A is shown in FIG. 8 as part of the container orchestration service 130, in other embodiments, all or a portion of the pod scheduling unit 186A may be implemented by other components of the hosted computing network 120 and/or another computing device. For example, in certain embodiments of the present disclosure, another computing device in communication with the hosted computing network 120 may include several modules or components that operate similarly to the modules and components illustrated as part of the container orchestration service 130. It will also be appreciated that, in some embodiments, a user computing device (e.g., the user computing device 102 of FIG. 1) may implement functionality that is otherwise described herein as being implemented by the elements and/or modules of the container orchestration service 130. For example, the user computing device 102 may receive code modules or other instructions from the container orchestration service 130 and/or other components of the hosted computing network 120 via the network 104 that are executed by the user computing device 102 to implement various aspects of the present disclosure.

Example Architecture of Serverless Container Management Service

Figure 9:
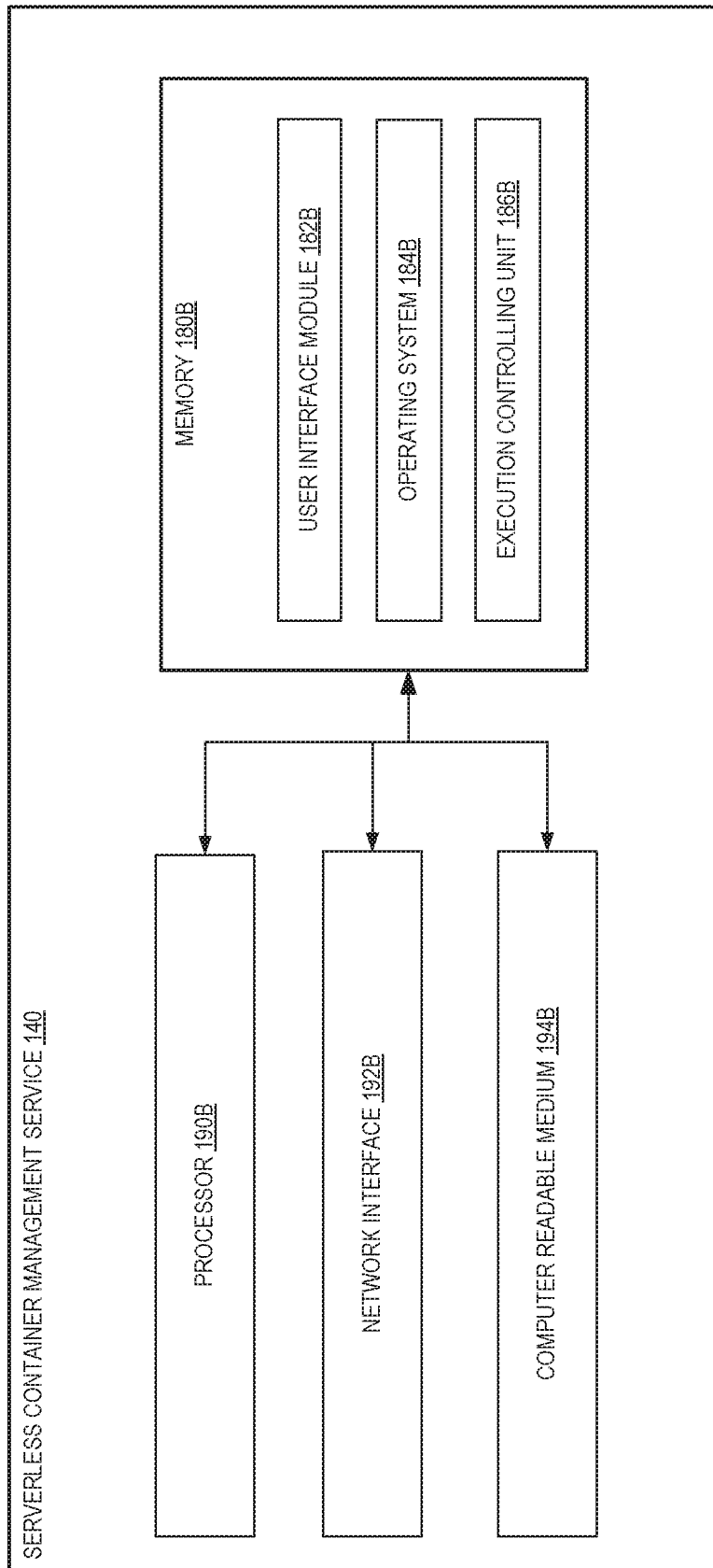
FIG. 9 depicts a general architecture of a computing device or system providing a serverless container management service in accordance with aspects of the present disclosure.

FIG. 9 depicts an example architecture of a computing system (referred to as the serverless container management service 140) that can be used to perform one or more of the techniques described herein or illustrated in FIGS. 1-7. The general architecture of the serverless container management service 140 depicted in FIG. 9 includes an arrangement of computer hardware and software modules that may be used to implement one or more aspects of the present disclosure. The serverless container management service 140 may include many more (or fewer) elements than those shown in FIG. 9. It is not necessary, however, that all of these elements be shown in order to provide an enabling disclosure. As illustrated, the serverless container management service 140 includes a processor 190B, a network interface 192B, and a computer readable medium 194B, all of which may communicate with one another by way of a communication bus. The network interface 192B may provide connectivity to one or more networks or computing systems. The processor 190B may thus receive information and instructions from other computing systems or services via the network 104 illustrated in FIG. 1.

The processor 190B may also communicate with memory 180B. The memory 180B may contain computer program instructions (grouped as modules in some embodiments) that the processor 190B executes in order to implement one or more aspects of the present disclosure. The memory 180B may include RAM, ROM, and/or other persistent, auxiliary, or non-transitory computer-readable media. The memory 180B may store an operating system 184B that provides computer program instructions for use by the processor 190B in the general administration and operation of the serverless container management service 140. The memory 180B may further include computer program instructions and other information for implementing one or more aspects of the present disclosure. For example, in one embodiment, the memory 180B includes a user interface module 182B that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180B may include or communicate with one or more data stores.

In addition to and/or in combination with the user interface module 182B, the memory 180B may include an execution controlling unit 186B that may be executed by the processor 190B. In one embodiment, the execution controlling unit 186B implements various aspects of the present disclosure, e.g., processing code execution requests, acquiring compute capacity, attaching network interfaces, and/or other aspects discussed herein or illustrated in FIGS. 1-7.

While the execution controlling unit 186B is shown in FIG. 9 as part of the serverless container management service 140, in other embodiments, all or a portion of the execution controlling unit 186B may be implemented by other components of the hosted computing network 120 and/or another computing device. For example, in certain embodiments of the present disclosure, another computing device in communication with the hosted computing network 120 may include several modules or components that operate similarly to the modules and components illustrated as part of the serverless container management service 140. It will also be appreciated that, in some embodiments, a user computing device (e.g., the user computing device 102 of FIG. 1) may implement functionality that is otherwise described herein as being implemented by the elements and/or modules of the serverless container management service 140. For example, the user computing device 102 may receive code modules or other instructions from the serverless container management service 140 and/or other components of the hosted computing network 120 via the network 104 that are executed by the user computing device 102 to implement various aspects of the present disclosure.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, blocks or steps. Thus, such conditional language is not generally intended to imply that features, elements, blocks or steps are in any way required for one or more embodiments or that one or more embodiments necessarily include logic for deciding, with or without other input or prompting, whether these features, elements, blocks or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
a serverless container management service of a cloud provider network, wherein the serverless container management service is configured to acquire and manage compute capacity on behalf of users of the cloud provider network and execute a containerized application using the acquired compute capacity in response to a request to execute the containerized application; and
a third party container orchestration service in networked communication with the serverless container management service,
wherein the serverless container management service is further configured to at least:
  receive, from the third party container orchestration service, a request to execute at least a first program code, wherein the request indicates one or more code execution parameters according to which the first program code is to be executed;
  determine, based at least in part on the one or more code execution parameters, that execution of the first program code requires multiple network interfaces to be configured for the underlying compute capacity to be used to execute the first program code;
  determine that a first network interface of the multiple network interfaces to be used to execute the first program code belongs to the third party container orchestration service;
  configure the first network interface using a first credential associated with the third party container orchestration service;
  determine that a second network interface of the multiple network interfaces to be used to execute the first program code belongs to a client of the third party container orchestration service;
  identify a credential vending service associated with the third party container orchestration service;
  query the credential vending service for a second credential of the client of the third party container orchestration service;
  configure the second network interface using the second credential associated with the client of the third party container orchestration service; and
  execute the first program code on the compute capacity configured with both the first network interface and the second network interface.

2. The system of claim 1, wherein the first network interface is connected to a first virtual private network, and the second network interface is connected to a second virtual private network different from the first virtual private network.

3. The system of claim 1, wherein the serverless container management service is further configured to at least store at least a portion of the one or more code execution parameters as code execution metadata, and wherein the code execution metadata is accessible by one or more processes of the first program code.

4. The system of claim 1, wherein the serverless container management service is further configured to at least execute a process of the first program code on the compute capacity in a first network namespace, and wherein the process is configured to create a second network namespace and initiate one or more other processes of the first program code in the second network namespace.

5. A computer-implemented method comprising:
receiving, from a caller system, a request to execute at least a first program code, wherein the request indicates one or more parameters to be used to execute the first program code;
determining, based at least in part on the one or more parameters, that the first program code is to be executed using multiple network interfaces;
determining that a first network interface of the multiple network interfaces to be used to execute the first program code belongs to the caller system;
configuring the first network interface using a first credential associated with the caller system;
determining that a second network interface of the multiple network interfaces to be used to execute the first program code belongs to an entity other than the caller system;
obtaining a second credential to be used to configure the second network interface from the caller system or another system associated with the caller system;
configuring the second network interface using the obtained second credential; and
executing the first program code on compute capacity configured with both the first network interface and the second network interface.

6. The computer-implemented method of claim 5, wherein the first network interface is connected to a first virtual private network, and the second network interface is connected to a second virtual private network different from the first virtual private network.

7. The computer-implemented method of claim 5, further comprising storing at least a portion of the one or more parameters as metadata, wherein the metadata is accessible by one or more processes running on the compute capacity.

8. The computer-implemented method of claim 5, further comprising executing a process associated with the first program code on the compute capacity in a first network namespace, wherein the process is configured to create a second network namespace and initiate one or more other processes associated with the first program code in the second network namespace.

9. The computer-implemented method of claim 8, wherein the first network namespace is attached to the first network interface, and the second network namespace is attached to the second network interface.

10. The computer-implemented method of claim 5, further comprising obtaining the second credential from a credential vending service associated with the caller system.

11. The computer-implemented method of claim 5, wherein the first program code comprises a container orchestration node agent.

12. The computer-implemented method of claim 5, further comprising, subsequent to executing the first program code on the compute capacity, executing a container orchestration pod received from a user of the caller system on the compute capacity.

13. The computer-implemented method of claim 5, wherein the compute capacity is one of a virtual machine instance, a bare-metal instance, or a microVM.

14. The computer-implemented method of claim 13, wherein the compute capacity is a bare-metal instance, and before the first program code is executed on the bare-metal instance, the bare-metal instance is configured with both the first network interface and the second network interface based on the first program code requiring the first network interface and the second network interface.

15. A non-transitory computer-readable medium storing instructions that, when executed by a computing system, cause the computing system to perform operations comprising:
   receiving, from a caller system, a request to execute at least a first program code, wherein the request indicates one or more parameters to be used to execute the first program code;
   determining, based at least in part on the one or more parameters, that the first program code is to be executed using multiple network interfaces;
   determining that a first network interface of the multiple network interfaces to be used to execute the first program code belongs to the caller system;
   configuring the first network interface using a first credential associated with the caller system;
   determining that a second network interface of the multiple network interfaces to be used to execute the first program code belongs to an entity other than the caller system;
   obtaining a second credential to be used to configure the second network interface from the caller system or another system associated with the caller system;
   configuring the second network interface using the obtained second credential; and
   executing the first program code on compute capacity configured with both the first network interface and the second network interface.

16. The non-transitory computer-readable medium of claim 15, wherein the first network interface is connected to a first virtual private network, and the second network interface is connected to a second virtual private network different from the first virtual private network.

17. The non-transitory computer-readable medium of claim 15, wherein the operations further comprise storing at least a portion of the one or more parameters as metadata, wherein the metadata is accessible by one or more processes running on the compute capacity.

18. The non-transitory computer-readable medium of claim 15, wherein the operations further comprise executing a process associated with the first program code on the compute capacity in a first network namespace, wherein the process is configured to create a second network namespace and initiate one or more other processes associated with the first program code in the second network namespace, wherein the first network namespace is attached to the first network interface, and the second network namespace is attached to the second network interface.

19. The non-transitory computer-readable medium of claim 15, wherein the operations further comprise obtaining the second credential from a credential vending service associated with the caller system.

20. The non-transitory computer-readable medium of claim 15, wherein the operations further comprise, subsequent to executing the first program code on the compute capacity, executing a container orchestration pod received from a user of the caller system on the compute capacity.

\* \* \* \* \*

UNITED STATES PATENT AND TRADEMARK OFFICE
CERTIFICATE OF CORRECTION

| | | |
|---|---|---|
| PATENT NO. | : 11,422,844 B1 | Page 1 of 1 |
| APPLICATION NO. | : 16/698655 | |
| DATED | : August 23, 2022 | |
| INVENTOR(S) | : Onur Filiz et al. | |

It is certified that error appears in the above-identified patent and that said Letters Patent is hereby corrected as shown below:

On the Title Page

Item (72) at Line 16, under Inventors, after "Seattle, WA (US)" add --; Venkata Satya Shyam Jeedigunta, Seattle, WA (US)--

Signed and Sealed this
Twenty-seventh Day of May, 2025

Coke Morgan Stewart
*Acting Director of the United States Patent and Trademark Office*